Jan. 9, 1968  J. C. E. FLINT  3,362,161

HYDRAULIC APPARATUS

Filed Feb. 9, 1966

INVENTOR
John C. E. Flint
BY
Christensen, Sanborn and Matthews ATTORNEY

United States Patent Office 3,362,161
Patented Jan. 9, 1968

3,362,161
HYDRAULIC APPARATUS
John C. E. Flint, Chalford, England, assignor to Dowty Technical Developments Limited, Cheltenham, England, a British company
Filed Feb. 9, 1966, Ser. No. 526,149
Claims priority, application Great Britain, Mar. 1, 1965, 8,705/65
7 Claims. (Cl. 60—53)

This invention relates to hydraulic apparatus and more particularly to hydrostatic power transmissions.

In accordance with the present invention a hydrostatic power transmission comprises a variable positive displacement pump unit, a variable positive displacement motor unit, each unit comprising a rotary cylinder block having a plurality of cylinders, a piston in each cylinder reciprocated by rotation of the block, a valve having two main ports co-operating with the cylinder block to connect the cylinders alternately to the main ports during block rotation and adjusting means for the valve to adjust it angularly about the rotation axis of the block to vary effective displacement of the unit by varying the phase angle between piston reciprocation and alternate connection of the cylinders to the main ports, and at least one hydraulic connection between the main ports of the units.

The pump unit or the motor unit or both may be of the kind having cylinders extending parallel or nearly parallel to the block rotation axis.

The pump and motor units may be secured together with their drive shafts extending co-axially in opposite directions and with their valves adjacent to one another.

Each valve may comprise a plate in which the main ports are of arcuate shape for co-operation with cylinder ports in the associated cylinder block and a valve head on opposite sides of which the plates are arranged to seat, and a pair of passages extending through the heads between the two plates to connect the main ports. Preferably the angular adjusting movement of each valve plate on the head is not sufficient to cause any main port to overlap a passage. This will ensure that the hydraulic balance of the valve plates is not altered during operation. The most effective hydraulic balance is obtained by arranging that each port has the same area on each side of each valve plate.

Figure 1:
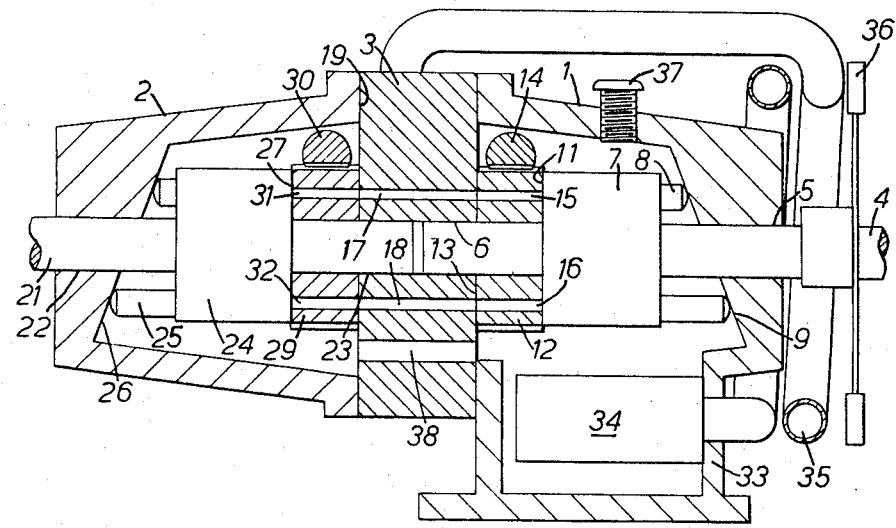
Figure 2:
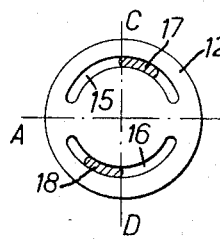
Figure 3:
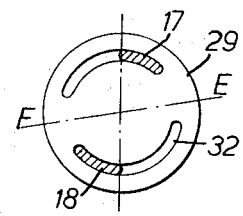
Figure 4:
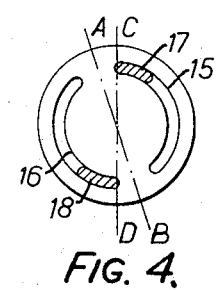
Figures 5, 6:
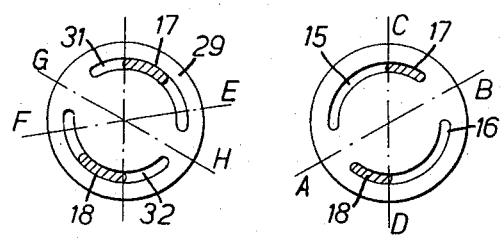

How the invention can be carried into effect will hereinafter be particularly described with reference to the accompanying drawings in which, FIGURE 1 is a cross section through the transmission, FIGURES 2 and 3 are plan views of the pump and motor valve plates at the zero speed ratio condition, FIGURES 4 and 5 are plan views of the pump and motor valve plates at the maximum forward speed ratio condition, and FIGURE 6 is a plan view of the pump valve plate for the reverse speed ratio condition.

Reference is made initially to FIGURE 1 of the drawings. In this embodiment a hollow pump casing 1 and a hollow motor casing 2 are secured by bolts or the like on either side of a valve head 3. The pump drive shaft 4 is carried in bearings 5 and 6 in the casing 1 and the head 3 and within the casing a rotary cylinder block 7 is secured to the shaft 4 for rotational drive, the block however being free to slide on the shaft 4. Within the block 7 a plurality of cylinders are provided equally spaced around the block and each extending parallel to the block rotation axis. Pistons 8 extend from the cylinder block 7 and engage an inclined end surface 9 of the casing 1. The surface 9 is flat and inclined to the rotation axis of the shaft 4. Slippers may be provided at the ends of the pistons 8 to engage the flat surface 9.

The end of the block 7 opposite to the pistons 8 is formed with a flat valve surface 11 into which ports open from the cylinders. The surface 11 engages a valve plate 12 which in turn engages against the surface 13 of the head 3. A rack 14 slidable in the casing 1 engages teeth on the periphery of the plate 12 to adjust the angular position thereof about the rotation axis of the shaft 4. The plate 12 includes two kidney-shaped main ports 15 and 16 extending therethrough. The ports have equal areas in the two opposite flat surfaces of the valve plate.

The main ports 15 and 16 co-operate with a pair of main passages 17 and 18 extending through the valve head 3 from the surface 13 thereof to the flat surface 19 which opens into the motor casing 2.

In the motor casing 2 a motor drive shaft 21 is mounted in a bearing 22 in the casing 3 and a bearing 23 in the valve head 3. On the shaft 21 a cylinder barrel 24 is mounted which is adapted to rotate the shaft 21 but at the same time is capable of sliding movement on it. The cylinder block 24 includes a number of equally spaced cylinders, each of which extends parallel to the rotation axis. From these cylinders pistons 25 extends to engage a flat inclined surface 26 within the casing 2. The end of the block 24 opposite to the pistons 25 is formed with a flat valve surface 27 into which open ports from the cylinders. Valve surface 27 engages a valve plate 29 which in turn engages on the surface 19 of the valve head 3. A rack 30 engages teeth on the periphery of the valve plate to adjust its angular position. A pair of kidney shaped main ports 31 and 32 extend through the valve plate 29 and have equal areas on opposite sides thereof. Ports 31 and 32 co-operate with the cylinder ports in the surface 27 and also with the main passages 17 and 18 in the valve head 3.

The pump casing 1 is provided with a sump 33 in which is located a filter 34. From the filter 34 a coiled pipe 35 extends externally of the casing 1 in a number of coils and eventually terminates in the valve head 3 being connected through non-return valves to the two main passages 17 and 18 such that low pressure liquid will enter the passage 17 or 18 at lower pressure. Liquid at low pressure is obtained by the centrifuging effect of rotation of the block 7 in the casing 1, the small centrifuging pressure developed being arranged to force liquid from the sump 33 through the filter 34 and the pipe 35 into the valve head 3. A fan 36 mounted on the pump drive shaft 4 is arranged to drive cooling air over the coiled pipe 35. A filter 37 on the casing 1 enables the casing to be topped up with working liquid. A passage 38 through the valve head 3 enables leakage collected in the motor casing 2 to flow back into the sump 33. The transmission is provided with a high pressure relief valve and other conventional valves. These are preferably located in the valve head 3.

Reference is now made to FIGURES 2 and 3. FIGURE 2 is the plan view of the valve plate 12 obtained if the cylinder block 7 is removed. For simplicity FIGURE 3 is the plan view of the valve plate 29 viewed from the position of the valve head 3. By taking the views in this way the passages 17 and 18 take up the same position in the two views. The main ports 15 and 16 are of conventional kidney shape and together extend over almost a complete circle, the adjacent end of these main ports being spaced by a short ungrooved portion of the valve plate over which the cylinder ports must pass. The distance between each pair of adjacent ends of the main ports is approximately equal to the arcuate length of each cylinder port so that the cylinder ports cannot connect the main ports together during their movement from one main port to the other. An axis across the valve plate in FIGURE 2 represented by the line A—B is a reference axis to indicate the angular position of the valve plate. This line extends midway between the adjacent ends of the main ports 15 and 16. The axis C—D of FIGURE 2 is based on the direction of inclination of the flat surface 9 to the rotation axis of the drive shaft 4. The position C represents the position at which pistons attain their inner dead centre position and the position D indicates the position at which the pistons attain their outer dead centre position. FIGURE 3 shows a plan view of the motor valve 29 as viewed from the direction of the pump cylinder block 7. This enables the passages 17 and 18 to appear in the same position as they appear in FIGURE 2. The inclined surface 26 of the motor is so positioned that the inner and outer dead centre positions occur at the valve plate positions E and F. The line E—F therefore represents the setting of the inclined surface 26 relatively to the rotation axis of the motor shaft 21. In FIGURE 1 the flat surfaces 9 and 26 have not been shown in their correct relative positions in order to make the drawing more easy to understand. In fact the reference axes C—D and E—F for the two inclined surfaces 9 and 26 are inclined almost at right angle to one another when referred to the rotation axis. Arranging the inclined surfaces in this way enables the passages 17 and 18 through the valve head 3 to be simple passages extending parallel to the rotation axis. In FIGURE 3 the line E—F has been arranged to pass centrally between the adjacent ends of the main ports 31 and 32 in the valve plate and thus it coincides with the reference axis of the valve plate. The reference axis of the valve plate will appear more clearly in FIGURE 5. By arranging in FIGURE 3 that the axis E—F of the inclined surface 26 coincides with the reference axis of the valve plate 29 the motor is arranged to operate at maximum displacement. In this case the phase angle between piston reciprocation and alternate connections of the cylinders to the main ports is zero.

For operation of the transmission with the valve plate set as shown in FIGURES 2 and 3, rotation of the cylinder block 7 is in the clockwise sense on the valve plate 12 as seen in FIGURE 2. Each cylinder will connect to the port 15 halfway along the inward stroke of its piston and whilst it is in connection with this port the piston will move to its inner dead centre position and halfway along its outward stroke so that the displacement of liquid from the cylinder to the port 15 is zero. Similarly for a cylinder connecting to the port 16 the total displacement is zero. Therefore no liquid is delivered by the pump and the motor will not rotate. In this position for the valve plate 12 the angle between the axes A—B and C—D is 90°. This angle is the phase angle between piston reciprocation and alternate connection of the cylinders to the main ports.

Assume now that the pump valve plate 12 is adjusted to the position shown in FIGURE 4 by rotating it in a clockwise sense by an angle of about 70° to make the phase angle about 20°. For clockwise rotation of the block 7 a piston whose cylinder connects to the port 15 will be moving almost completely from its inner dead centre to its outer dead centre position whilst for a cylinder connected to the port 16 its piston will be moving from an outer dead centre to an inner dead centre position. Thus liquid will be withdrawn from the passage 17 and delivered to the passage 18 at substantially the maximum delivery for the pump. Assume now that the motor valve plate 29 is in the FIGURE 3 position. The liquid delivered to the passage 18 will enter the port 32 and act on pistons connected to the port 32 causing them to move from inner dead centre to outer dead centre. Thus the cylinder block 24 mounted on the valve plate 29 will rotate in a clockwise direction as seen from the FIGURE 3 position. Motor cylinders moving over the port 31 will deliver liquid to the main pasasge 18. Assuming that the pump and motor cylinders are of the same dimensions this arrangement would give substantially a one-to-one speed ratio between pump and motor. In order to increase motor speed the motor valve plate may now be moved to the position shown in FIGURE 5 by a clockwise rotation of about 60° to change the motor phase angle from 0° to 60°. The reference axis G—H of the valve plate 29 is now moved from the reference axis E—F of the surface 26. For a cylinder in connection with the port 32 and passage 18 its piston will move about three quarters of a stroke to the outer dead centre position and then about a quarter of a stroke from the outer dead centre towards the inner dead centre position so that the effective displacement of such a cylinder is about half that which it would have when the valve plate is in the FIGURE 3 position. For a cylinder in connection with the port 31 and passage 17 its piston will move about three quarters of a stroke to the inner dead centre position and then about one quarter of a stroke from the inner dead centre towards the outer dead centre position so that about one half of the displacement of the piston is delivered into the passage 17. The volumetric capacity of the motor is thus reduced by about one half when the valve plate 29 is moved to the FIGURE 5 position, and the motor will then move about approximately twice the speed of the pump. For reverse propulsion the pump valve plate is moved to the FIGURE 6 position by rotation in the anti-clockwise direction from the FIGURE 2 position by about 30° giving a pump phase angle of 120°. For a cylinder connecting to the port 15 during clockwise rotation of the block 7 the piston will move towards and away from the inner dead centre position, the movement towards the inner dead centre being greater than the movement away from the inner dead centre. The difference between these two parts of the movement give the actual displacement of the piston. Since movement to the inner dead centre is greater than movement from the inner dead centre there will be a displacement of liquid into the passage 17. Similarly for cylinders connecting to the port 16 there will be a displacement of liquid from the passage 18 into the cylinder. The displacement of the pump is therefore reversed, liquid being drawn from the passage 18 and delivered into the passage 17. The reverse displacement of the pump may rise to one half the maximum displacement in the forward direction. The motor valve plate may be set at either the positions of FIGURES 3 or 5 or any position between. If the FIGURE 3 position is selected the motor will rotate in the anti-clockwise sense as seen from the FIGURE 3 position at a slow rate at considerable torque amplification. Movement of the motor valve plate towards the FIGURE 5 position will increase the motor speed. Movement of the pump valve plate 12 towards the FIGURE 2 position will reduce the motor speed.

During rotation of the pump cylinder block, liquid within the casing 1 will be centrifuged and a low pressure head will be developed at the periphery of casing 1 to urge liquid through the filter and the cooling pipe 35 into the valve head 3 for priming the transmission. Air flow induced by the fan 36 will cool the oil as it flows through pipe 35.

Limits to the adjustment of the valve plate 12 on the valve head 3 are provided which prevent the valve plate from further clockwise rotation from the FIGURE 4 position or from further anti-clockwise rotation from the FIGURE 5 position. In these positions the passages 17 and 18 are located at one end or the other of the main ports 15 and 16. Any further movement from either one of these position that would allow passages 17 and 18 to overlap the ends of the main ports 15 and 16 would unbalance the valve plate in the axial sense in that hydraulic pressure at the face thereof engaging the valve head 3 would have a greater effective area than hydraulic pressure at the surface thereof engaging the cylinder block.

Hydraulic force would therefore act to urge the valve plate away from the valve head giving rise to excessive leakage and making the transmission inefficient. If the passages 17 and 18 are not to restrict flow of liquid unduly they must have an angular dimension about the rotation axis of about 40° as illustrated. This means that in the maximum forward displacement of the pump given by the valve plate position of FIGURE 4 the axis A—B cannot coincide with the axis C—D to give the theoretical maximum displacement from the pump cylinders. Although however the valve plate only approaches to within about 20° of the position of coincidence of these axes the pump delivery obtained at this position is 95% of the theoretical maximum. In the FIGURE 6 position of valve plate 12 giving reverse pump displacement, about one half of the theoretical maximum capacity of the pump is obtained without the ports 15 and 16 overlapping the passages 17 and 18.

The motor valve plate 29 is provided with limits of adjustment allowing it to move only between the positions of FIGURES 3 and 5. A comparatively small adjustment only is required for the motor displacement and the problem that the ports 31 and 32 will overlap the passages 17 and 18 does not arise.

Separate independent controls for the pump and motor valve plates may be provided or alternatively a single control may be provided which acts on one valve plate or the other. For example, the first part of movement of such a control could move the pump valve plate 12 from the FIGURE 2 to the FIGURE 4 position and the second part of movement of such a control could move the motor valve plate from the FIGURE 3 to the FIGURE 5 position thus giving a full adjustment of the transmission from zero speed ratio to maximum forward speed ratio. Such a main control in the reverse sense could initially move the pump valve plate 12 from the FIGURE 2 to the FIGURE 5 position and then would move the motor valve plate 29 from the FIGURE 3 to the FIGURE 5 position giving a range of reverse speed ratio from zero to maximum.

Whilst in the described embodiment the pump and the motor have been compactly arranged to form a unit transmisison it will be appreciated that the pump and the motor could be used separately provided that hydraulic passages of considerable length are provided which replace the hydraulic passages 17 and 18 in the valve head.

In the described embodiment angular movement of each valve plate is limited since the passages 17 and 18 must not overlap the ends of the ports 15, 16, 31 or 32. This overlap would unbalance the valve plates in the axial sense and render them difficult to turn. The valve ports could be connected within the valve head 3 by ports in cylindrical surfaces which cannot exert unbalancing force on the valve plates. Alternatively to avoid limitations on valve movement the valves themselves may be pintle valves having cylindrical surfaces and fitting one within each block.

I claim as my invention:

1. A hydrostatic power transmission comprising a variable positive displacement pump unit, a variable positive displacement motor unit, each unit comprising a rotary cylinder block having a plurality of cylinders, a piston in each cylinder reciprocated by rotation of the block, a valve having two main ports co-operating with the cylinder block to connect the cylinders alternately to the main ports during block rotation and adjusting means for the valve to adjust it angularly about the rotation axis of the block to vary effective displacement of the unit by varying the phase angle between piston reciprocation and alternate connection of the cylinders to the main ports, and at least one hydraulic connection between the main ports of the units.

2. A hydrostatic power transmission as claimed in claim 1 wherein at least one of the pump and the motor units is of the kind having cylinders extending substantially parallel to the block rotation axis.

3. A hydrostatic power transmission as claimed in claim 1 wherein the pump and the motor units are secured together with their drive shafts extending in opposite directions and their valves adjacent to one another.

4. A hydrostatic power transmission as claimed in claim 3 wherein each valve comprises a plate in which the main ports are of arcuate shape for co-operation with cylinder ports in the associated cylinder block and a valve head on opposite sides of which the plates are arranged to seat, a pair of passages extending through the head between the two plates to connect the main ports.

5. A hydrostatic power transmission as claimed in claim 4 wherein the angular adjusting movement of the plates is limited so that over the range of adjusting movement no main port overlaps its associated passage.

6. A hydrostatic power transmission as claimed in claim 5 wherein each main port has the same area on either side of the plate in which it is formed.

7. A hydrostatic power transmission as claimed in claim 3 including a casing surrounding the pump and the motor to form the reservoir for working liquid, and a liquid connection extending from the periphery of the casing to the valves to conduct liquid at low centrifugal pressure from the casing to prime the transmission.

References Cited

UNITED STATES PATENTS

| | | | |
|---|---|---|---|
| 1,924,017 | 8/1933 | Bedford | 60—53 |
| 2,546,583 | 3/1951 | Born | 103—162 |
| 3,132,486 | 5/1964 | Jonkers et al. | 60—53 |

EDGAR W. GEOGHEGAN, *Primary Examiner.*